Sept. 18, 1928. Re. 17,084
L. HUFFMAN
KNOB LOCK
Original Filed March 3, 1919 2 Sheets-Sheet 1
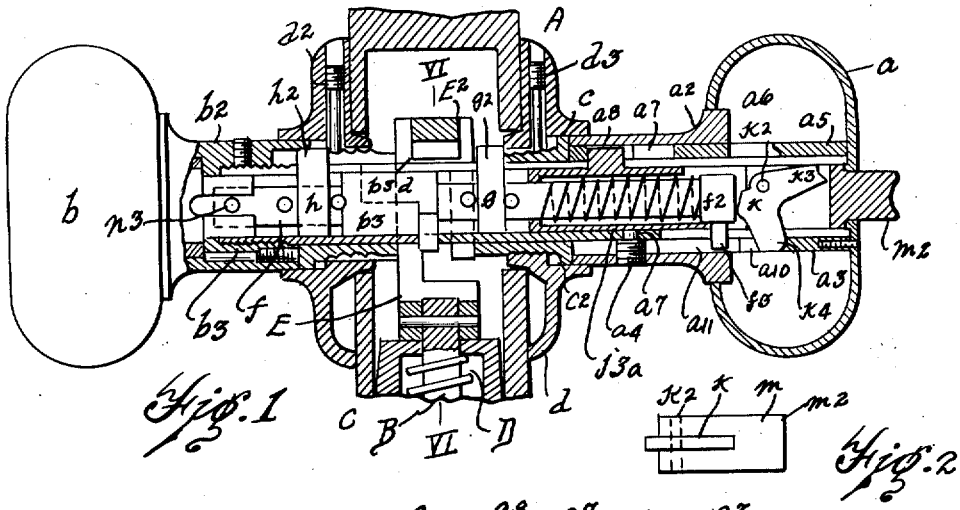
Fig. 1
Fig. 2
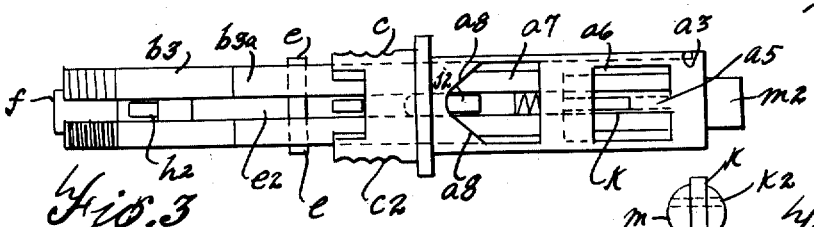
Fig. 3
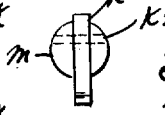
Fig. 4
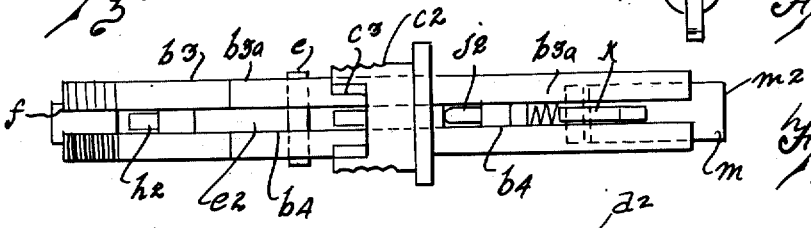
Fig. 5
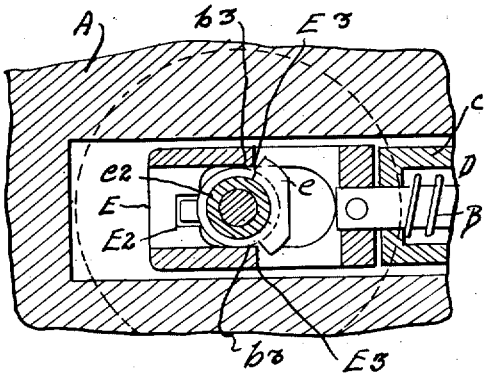
Fig. 6
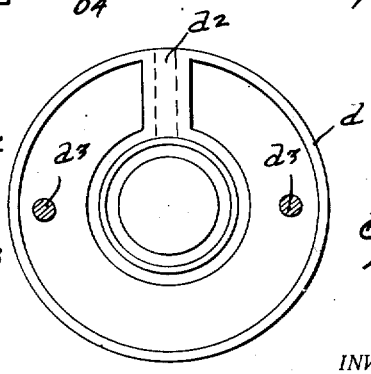
Fig. 7
INVENTOR.
LOUIS HUFFMAN
BY Parker & Burton
ATTORNEY.

Sept. 18, 1928.
Re. 17,084
L. HUFFMAN
KNOB LOCK
Original Filed March 3, 1919 2 Sheets-Sheet 2
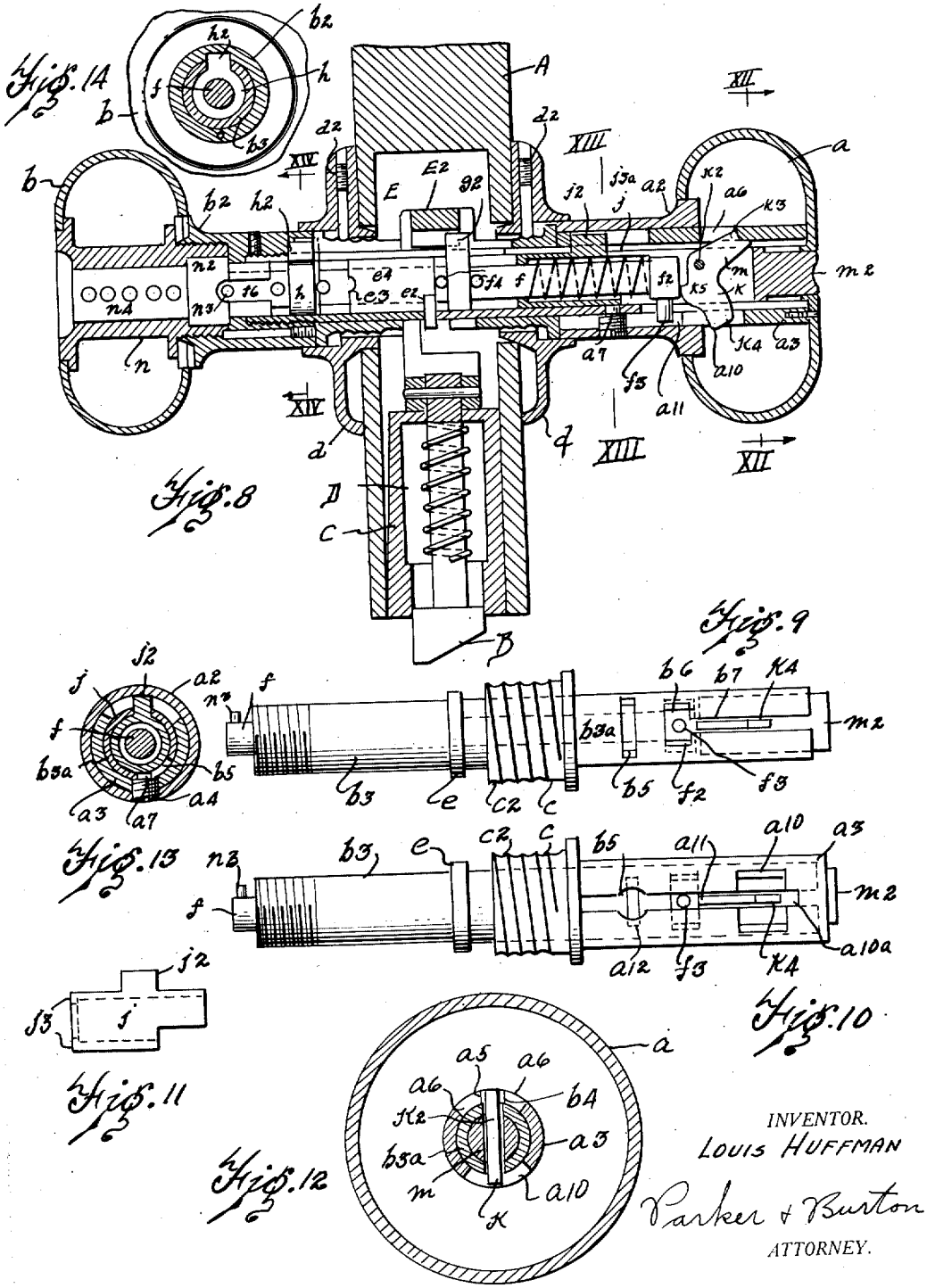
INVENTOR.
LOUIS HUFFMAN
Parker & Burton
ATTORNEY.

Reissued Sept. 18, 1928.

Re. 17,084

UNITED STATES PATENT OFFICE.

LOUIS HUFFMAN, OF TORONTO, ONTARIO, CANADA, ASSIGNOR TO SCHLAGE LOCK COMPANY, OF SAN FRANCISCO, CALIFORNIA, A CORPORATION OF CALIFORNIA.

KNOB LOCK.

Original No. 1,393,021, dated October 11, 1921, Serial No. 280,414, filed March 3, 1919. Application for reissue filed April 1, 1926. Serial No. 99,172.

My invention relates to knob locks and an object sought is to provide an improved construction that may be readily and conveniently manipulated to operate the locking mechanism. In this construction the knob may be locked by pressing a button from the inside of the door and released by turning the knob upon that side of the door and the locked mechanism may be released by a key from the outside.

In the accompanying drawings:

Figure 1 is a horizontal section through the axis of the knob spindles and adjacent parts and portion of the door, the parts being in their unlocked position.

Fig. 2 is a detail showing the push button and pawl carried thereby.

Fig. 3 is a plan view of the knob spindles, and a bearing sleeve therefor, looking from the upper portion of Fig. 1, the knobs being removed.

Fig. 4 is an end view of the parts shown in Fig. 2.

Fig. 5 is a view similar to Fig. 3, the spindle of the inside knob having been removed.

Fig. 6 is a section on the line VI—VI, Fig. 1.

Fig. 7 is an elevation of one of the escutcheons looking from the side which is toward the door when assembled.

Fig. 8 is a view similar to Fig. 1, the parts being shown in the position in which the locking apparatus is engaged to prevent the turning of the knob spindles.

Fig. 9 is a view similar to Fig. 5, looking at the opposite side to that shown in the latter figure.

Fig. 10 is a view similar to Fig. 3 showing the opposite side to that shown in the latter figure.

Fig. 11 is a side elevation of the sleeve $j$ detached from the rest of the apparatus.

Fig. 12 is a section on the line XII—XII of Fig. 8.

Fig. 13 is a detail section on the line XIII—XIII, Fig. 8.

Fig. 14 is a detail section on the line XIV—XIV, Fig. 8.

A is the door, B the latching and locking bolt, C the frame in which the bolt B reciprocates. D is a spring, acting at one end against the casing C and at the other end against the bolt B to force the bolt B into its latched or locked position. E is a yoke pinned at one end to the inner end of the bolt B. The yoke is acted upon by the knob to reciprocate the same and operate the bolt B.

$a$ is the inside knob. This has an axial aperture formed therethrough. $a^2$ is the knob shank and $a^3$ is a tubular spindle to which the knob $a$ is secured in the usual way by a set screw $a^4$. The spindle $a^3$ is provided with an aperture $a^6$ (Fig. 3) through its wall and is provided with a tongue $a^5$ extending into said aperture from the central part of the outer edge thereof. It is also provided with an aperture $a^7$ having converging inner edges $a^8$ $a^8$ which form means for centering the moving parts of the apparatus and returning them to their normal position as hereinafter described. Upon the other side of the spindle $a^3$ (Fig. 10) there is formed the substantially aperture $a^{10}$ having a narrow slot $a^{10a}$ extending into the outer edge thereof at the center of said edge. There is also a narrow slot $a^{11}$ extending from the center of the inner edge of the slot $a^{10}$ longitudinally for the whole remaining length of the spindle. This latter slot is enlarged at $a^{12}$ and provided with screw threads into which the set screw $a^4$ (Fig. 8) engages to bind the shank $a^2$ to the spindle $a^3$.

$b$ is the outer knob which also has axial apertures through its wall. $b^2$ is the shank of the knob $b$. $b^3$ $b^{3a}$ is the hollow cylindrical spindle of the knob $b$, this is made in two parts $b^3$ and $b^{3a}$ which are shaped to fit into each other at their contacting ends so that they rotate as one piece, as indicated by dotted lines in Fig. 1. There is a narrow slot $b^4$ (Fig. 5) for nearly the entire length of the spindle. Upon the other side of the spindle-part $b^{3a}$ (Fig. 9) there is a laterally enlarged slot or aperture $b^6$, and this extends in a narrow slot $b^7$ from the outer edge and center of the slot $b^6$. There is a slot $b^5$ extending for a considerable angular distance around the spindle part $b^{3a}$. The spindle $b^3$ $b^{3a}$ slides into the spindle $a^3$ and is secured from being withdrawn longitudinally therefrom by an extension $a^{4a}$ of the screw $a^4$ which passes into the slot $b^5$ and is of a breadth sufficient to engage both side walls of the slot $b^5$. In this way the spindles are restrained from movement in the direction of their lengths but may have a relative turning movement.

Within the spindles $a^3$ $b^3$ $b^{3a}$ and coaxial therewith is the rod $f$. Upon this rod is a sleeve $e^2$ having the bolt-operating lug $e$ extending therefrom, said lug extends through an opening between the inner ends of the spindle parts $b^3$ $b^{3a}$ so that when the spindle of the knob $b$ is turned it shall carry the lug $e$ with it and retract the bolt B in the usual way (Fig. 6). The sleeve $e^2$ usually may turn independent of the rod $f$. Rotatably sleeved upon the rod $f$ is an annulus $g$ having a lug $g^2$ extending outward therefrom through the slot $b^4$ in the spindle $b^3$ $b^{3a}$ with the edges of which slot its sides engage. $f^4$ indicates two pins rising from the rod $f$ and adapted to prevent the movement of the annulus $g$ longitudinally of the rod $f$, said annulus is located adjacent to the inner side of the yoke E as shown in the figures. In said yoke there is a slot $E^2$. The lug $g^2$ may engage in the slot $E^2$ as shown in Fig. 8, or may be removed therefrom, as shown in Fig. 1. There is a second annulus $h$ similar to the annulus $g$ but located adjacent to the outer surface of the door, as shown in the figures. This has a lug $h^2$ extending upward through the slot $b^4$ and there are provided two pins $f^5$ rising from the rod $f$ and limiting the motion of the annulus $h$ along the rod $f$. The pin $f^5$ adjacent to the sleeve $e^2$ is adapted to engage a cavity $e^3$ in the edge of the sleeve $e^2$ in which cavity said pin fits to definitely locate the angular position of the rod $f$.

$j$ is a sleeve around the rod $f$ adjacent to the end of said rod which is at the inside of the door. Said sleeve is of greater diameter internally than the rod $f$ and its inner end is turned inward as indicated at $j^3$ so as to engage the surface of the rod $f$. $f^2$ is an enlargement at the end of the rod $f$ and there is a spring $j^{3a}$ engaging the end $j^3$ of the sleeve $j$ and against the enlarged end $f^2$ of the rod $f$. This spring acts to press the rod $f$ toward the right and the sleeve $j$ toward the left. $j^2$ is a lug extending through the slot $b^4$ in the spindle of the knob $b$ and into the aperture $a^7$ in the sleeve $a^3$ of the knob $a$. The lug $j^2$ is pressed by the spring $j^{3a}$ against converging edges $a^8$ of the aperture $a^7$ which form cams acted upon by the lug $j^2$ to properly center or return to its normal position when removed therefrom, the sleeve, or spindle, $a^3$. $f^3$ is a pin extending radially outward from the enlarged end $f^2$ of the rod $f$ through the slots or apertures $b^6$ or $b^7$ in the spindle of the knob $b$ and into the slot $a^{11}$ in the spindle $a^3$.

$m$ is a push button against the outer surface $m^2$ of which an operator's finger may be pressed to actuate said button. $k$ is a pawl pivoted at $k^2$ in a slot in the button $m$ above the axis of said button and having an arm $k^3$ adapted to be thrown out into the slot $a^6$ of the spindle $a^3$, its end being adapted to engage against the end of the projection $a^5$.

$n$ is a pin-lock casing engaging in the apertured walls of the knob $b$. $n^4$ is the barrel of the pin-lock having an enlarged inner end $n^2$ engaging against a shoulder in the casing $n$ to prevent the removal of said lock. There is a slot $n^3$ in the outwardly extending portion of the barrel $n^4$ which engages a pin $f^6$ extending radially from the rod $f$ by which construction the oscillation of the barrel $n^4$ will turn the rod $f$ while permitting the free longitudinal movement of said rod.

The pawl $k$ engages the end of the rod $f$ at $k^5$ below the pivot $k^2$ so that the action of the rod $f$ impelled by the spring $j^{3a}$ is to turn said pawl about the pivot $k^2$ and throw the arm $k^3$ upward into the slot $a^6$. The pawl $k$ also has an arm $k^4$ which extends through a slot $b^7$ in the spindle of the knob $b$ and into an aperture or slot $a^{10}$ in the spindle $a^3$ and it may extend into the slot $a^{10a}$, and engage both walls thereof.

Turning to Fig. 1, it will be observed that the two knobs $a$ and $b$ are locked together by the lug $f^3$ engaging in the slot $b^7$ in the spindle of the knob $b$ and in the slot $a^{11}$ of the spindle $a^3$. The lug $g^2$ is clear from the yoke $e$ and both knobs may be turned to actuate the bolt B in the usual way. If, however, the operator presses at $m^2$ upon the button $m$, he pushes said button in, carrying the rod $f$ with it against the action of the spring $j^{3a}$. As soon as the upper end of the arm $k^3$ of the pawl $k$ clears the end of the lug or extension $a^5$ said arm is thrown upward engaging against the end of said extension or lug as shown in Fig. 8. This holds the rod $f$ at the limit of its travel to the left and engages the lug $g^2$ in the slot $E^2$. In this position the knob $b$ is held from rotation by the engagement of the lug $g^2$ so that the door can not be opened from the outside. However, if one turns the knob $a$ he will carry the projection $a^5$ laterally beyond the end of the engaging arm $k^3$ of the pawl $k$ and the spring $j^{3a}$ will then throw the rod $f$ toward the right and the button $m$ outward. The arm $k^4$ of the pawl $k$ engaging against the edge of the slot $a^{10a}$ in the sleeve $a^3$, the pawl being thereby turned so as to bring the arm $k^3$ within the spindles as shown in Fig. 1.

In the locked position shown in Fig. 8 a key may be inserted from the outside and the barrel $n^4$ of the pin lock turned to turn the rod $f$, the pin $f^3$ in this position extending into the broad slot or aperture $b^6$ in the spindle of the knob $b$, and turn the knob $a$ by the action of the pin $f^3$ thereon thus carrying the sleeve $a^3$ to its disengaging position and causing the parts to act as above described to disengage the lug $g^2$ from the slot $E^2$ in the yoke E.

$c^2$ indicates the spiral groove on the outer cylindrical surface of the sleeve or bearing $c$. The escutcheon $d$ has a circular opening at its center, the sleeve $c$ passing through said opening. It is provided in each of the escutcheons $d$ with a radially acting screw $d^2$, the inner end of which engages in a groove $c^2$. If now the screw $d^2$ is loosened the escutcheon $d$ may be turned around the sleeve to adjust its inner surface against the door. The screw $d^2$ may be then set up to hold it in its adjusted position.

In the locked position shown in Fig. 8, the rod $f$ being in the extreme position toward the left the lug $h^2$ engages in a slot or notch extending into the knob-shank $b^2$ from its interior but not to its surface and prevents the relative turning of said shank so that it cannot be unscrewed from the outside to permit access to the locking mechanism.

What I claim is:

1. In an apparatus of the kind described, a knob spindle, a reciprocating part in said spindle adapted to lock the spindle at the one position of said part, a spring tending to force said reciprocating part to its unlocked position, a pawl adapted to engage said knob to hold said reciprocating part in its locked position, the engagement of said pawl and said knob being such that a turning of the knob shall release said engagement.

2. In an apparatus of the kind described, a knob spindle, a reciprocating part in said spindle adapted in one of its positions to lock said spindle, a spring tending to force said reciprocating part to its unlocked position, a pawl adapted to engage said knob to hold said reciprocating part in its locked position the engagement of said pawl and said knob being such that a turning of the knob shall release said engagement, said spring also acting upon said pawl to engage the same with said knob.

3. In an apparatus of the kind described, a knob having a spindle, a cam face on said spindle, and a lug on said spindle, a locking mechanism, a lug adapted to act on said cam surface, a pawl on a part of the locking mechanism adapted to engage said spindle lug to hold said mechanism in locking position, a spring acting upon said second mentioned lug to press it against said cam face and also acting upon a part of the locking mechanism to normally tend to disengage the same with the spindle lug, said pawl being actuated by said part of said locking apparatus under the impulse of said spring to cause the engagement of the same.

4. In an apparatus of the kind described, a knob, a cam surface on said knob, a lug acting against said cam face to rotate said knob to its normal position, said apparatus being provided with a reciprocating part, a spring acting upon said lug and said reciprocating part, a lug of limited width on said knob, a push button, a pawl pivoted to said push button and engaging said reciprocating part, the pivot of said pawl being out of the point of engagement between said reciprocating part and pawl so that the action of said spring shall tend to engage said pawl with said lug to hold the locking apparatus engaged, said knob being adapted to turn relative to said pawl to carry said lug out of the line of action of said pawl.

5. In an apparatus of the kind described having spindles, a bearing sleeve for said spindles having a spiral groove in its outer surface, an escutcheon surrounding said sleeve, a part of said escutcheon engaging in said groove, a set screw in said escutcheon engaging said sleeve to fix the escutcheon in its adjusted position.

6. In an apparatus of the kind described, a bearing sleeve having a spiral groove in its outer surface, an escutcheon surrounding said sleeve and a radially adjustable set screw in said escutcheon engaging in said groove.

7. In an apparatus of the kind described, a knob having a spindle, a locking apparatus in said spindle, said apparatus being adapted to be adjusted by the act of locking to prevent removal of said knob.

8. The combination with the latch in a lock and the spindle whereby it is actuated, of an inner and an outer knob on the spindle, and means carried by the inner knob for locking the outer knob against turning, said means leaving the inner knob free to turn.

9. The combination with the latch in a lock and the spindle whereby it is actuated, an inner and an outer knob on the spindle, a push button in the inner knob, and means actuated by said push button for locking the outer knob against turning and the latch against retraction, said locking means leaving the inner knob free to turn.

10. The combination with the latch in a lock and the spindle whereby it is actuated, of an inner and an outer knob on the spindle, a push button carried by the inner knob and adapted to be manually depressed, means actuated by said push button for locking the outer knob against turning, said push button and locking means leaving the inner knob free to turn, and means actuated by turning movement of the inner knob for releasing the locking mechanism.

11. The combination with the latch in a lock and the spindle whereby it is actuated, of an inner and an outer knob on the spindle, a push button carried by the inner knob and adapted to be manually depressed, means actuated by said push button for locking the outer knob against turning, said push button and locking means leaving the inner knob free to turn, means actuated by turning movement of the inner knob for releasing the locking mechanism, and means for automatically projecting the push button when the locking mechanism is released.

12. In a door lock the combination with the latch and the spindle whereby it is retracted, of a locking mechanism carried by the spindle, a knob on the spindle, and means in the knob for actuating the locking mechanism, said means adapted to be automatically released to unlock the locking mechanism by turning movement of the knob.

13. The combination with the latch in a lock and the spindle whereby it is actuated, of an inner and an outer knob on the spindle, a push button carried by the inner knob, means actuated by said push button for locking the outer knob against turning, and means actuated by retraction of the latch for releasing said locking means.

14. The combination with the latch in a lock and the spindle whereby it is actuated, of an inner and an outer knob on the spindle, a push button in the inner knob, means actuated by depression of the push button for locking the outer knob against turning and the latch against retraction, means for projecting the push button, and means actuated by turning movement of the inner knob releasing the push button and to permit it to be projected, said turning movement of the inner knob also releasing the means whereby the outer knob is locked against rotation and the latch against retraction.

15. In apparatus of the character described, a latch bolt, a spindle coupled therewith to actuate the same, a knob at each end of the spindle, a push button carried by one of the knobs, locking mechanism operatively associated with the push button to be actuated thereby to lock the latch against retraction by the opposite knob while permitting its retraction by pressure applied thereto without releasing the locking mechanism, said locking mechanism releasable upon rotation of the knob which carries the push button.

16. In apparatus of the character described, a latch bolt, a rotatable spindle coupled therewith to retract the same, an inner knob and an outer knob mounted on the spindle, locking means carried by the inner knob adapted to lock the outer knob against turning while leaving the latch free to be depressed by pressure applied thereto without releasing the outer knob for turning movement.

17. In a lock, a latch bolt, a rotatable spindle coupled therewith to retract the bolt, an inner knob on one end of the spindle, an outer knob on the opposite end of the spindle, a push button carried by the inner knob, locking mechanism associated with the push button to be actuated thereby to lock the outer knob while leaving the latch bolt free for depression upon pressure applied thereto without releasing the outer knob for turning movement, said locking mechanism adapted to be released and to release the outer knob for turning upon turning of the inner knob.

18. In a lock, a latch bolt, a rotatable spindle coupled therewith to retract the same, an outer knob on one end of the spindle, an inner knob on the opposite end of the spindle, a depressible push button carried by the inner knob, locking mechanism operatively associated with the push button to be moved into position upon depression of the push button to lock the outer knob against turning movement while permitting depression of the latch bolt by pressure applied thereto, said locking mechanism adapted when in position to prevent rotation of the outer knob to leave the inner knob free to turn and automatically releasable upon turning thereof.

19. In a lock, a latch bolt, a rotatable spindle coupled therewith to retract the same, an outer knob on one end of the spindle, an inner knob on the opposite end of the spindle, a push button carried by the inner knob, locking mechanism operatively associated with the push button adapted upon depression thereof to lock the outer knob against turning movement, and key controlled means carried by the outer knob adapted upon actuation thereof to release said locking mechanism to permit turning of the outer knob.

20. In a lock, a latch bolt, a rotatable spindle coupled therewith to actuate the same, an outer knob on one end of the spindle, an inner knob on the opposite end of the spindle, locking means carried by the inner knob operable to lock the outer knob against turning while leaving the inner knob free to turn and releasable upon the turning thereof, and key controlled means carried by the outer knob operable to release said locking means to permit turning of the outer knob.

21. A door lock having a latch bolt coupled with operating mechanism provided with a pair of manipulable members positioned on opposite sides of the door, a depressible push button mounted within one of said members, and locking mechanism coupled with the button to be actuated by the depression thereof to lock the latch bolt against withdrawal by the other manipulable member.

22. A door lock having a latch bolt coupled with operating mechanism provided with a pair of manipulable members postioned on opposite sides of the door, a depressible push button mounted within one of said members, and locking mechanism coupled with the button to be actuated by the depression thereof to lock the latch bolt against withdrawal by the other manipulable member, said locking mechanism releasable upon manipulation of the member carrying the push button.

23. A door lock having a latch bolt coupled with operating mechanism provided with a pair of manipulable members positioned on opposite sides of the door, a depressible push button mounted within one of said members, and locking mechanism coupled with the button to be actuated by the depression thereof to lock the latch bolt against withdrawal by the other manipulable member, said locking mechanism so arranged and constructed as to permit external depression of the latch bolt in closing the door without release of the locking mechanism, said mechanism being releasable upon manipulation of the member carrying the push button.

24. A door lock having a latch bolt, operating mechanism coupled therewith to withdraw the bolt, said mechanism provided with a manipulable member on each side of the door, a depressible push button carried by one of said manipulable members and held normally outwardly projected, and locking mechanism coupled with said push button to be actuated upon depression thereof to lock the manipulable member on the opposite side of the door against manipulation and releasable upon manipulation of the member that carries the push button.

25. A door lock having a latch bolt, operating mechanism coupled therewith to withdraw the bolt, said mechanism provided with a manipulable member on the inside of the door and a manipulable member on the outside of the door, a depressible push button carried by the manipulable member on the inside of the door and held normally projected, locking mechanism coupled with said push button to be actuated by the depression thereof to lock the latch bolt against withdrawal by the manipulable member on the outside of the door while leaving the latch bolt free for depression in the closing of the door without releasing the locking mechanism, said locking mechanism releasable upon manipulation of the member on the inside of the loor, and key controlled means accessible from the outside of the door for releasing said locking mechanism.

26. A door lock having a latch bolt held normally projected to latch the door, operating mechanism coupled therewith to withdraw the bolt, said mechanism including rotatable spindle portions extending to opposite sides of the door and each provided with a manipulable member, a depressible push button carried by the spindle portion extending to the inside of the door, locking mechanism coupled therewith to be actuated by the depression thereof to lock the bolt against withdrawal by the manipulable member on the outside of the door, said locking mechanism releasable upon manipulation of the member on the inside of the door and key controlled means carried by the spindle portion extending to the outside of the door operable to release said locking mechanism.

LOUIS HUFFMAN.